United States Patent Office 2,816,880
Patented Dec. 17, 1957

2,816,880

WAXY N-VINYLOXYALKYL-ALKANE-CARBOXAMIDES

Sidney Melamed, Philadelphia, Pa., assignor to Rohm & Haas Company, Philadelphia, Pa., a corporation of Delaware No Drawing. Application December 8, 1954,
Serial No. 474,006

16 Claims. (Cl. 260—77.5)

This invention relates to waxy N-vinyloxyalkylalkane-carboxamides.

It is particularly concerned with the production of compositions which serve as synthetic waxes and with novel copolymers having surface-active properties.

The compounds of the present invention include unsaturated compounds having the structure of Formula I:

(I) 

where A is an alkylene group having 2 to 3 carbon atoms of which at least 2 in a chain separate the adjoining ether oxygen and nitrogen atoms, R is H or $CH_3$, and R' is an alkyl group having from 11 to 17 carbon atoms. The polymers and copolymers of the compounds of Formula I are also part of the present invention.

The monomeric compounds of the present invention may be produced by reacting aminoalkyl vinyl ethers with esters of higher fatty acids, such as the methyl or ethyl esters or the acids from lauric to stearic. The reaction may be effected in the presence of an alkali metal alkoxide, such as sodium methoxide, in an amount of 1% to 10%, preferably about 5%, on the weight of the reactants. The reaction may be effected in the presence of a solvent, preferably in an alcohol corresponding to the alkyl group of the ester that is reacted. Thus, when a methyl ester is used, reaction in methanol is preferred. The reaction mixture is refluxed at 60° to 80° C. for 4 to 8 hours and the product may be obtained by stripping off solvent and alcohol, and it may be purified by recrystallization, if desired.

An alternative process for producing the monomeric compounds of the present invention is to react an aminoalkyl vinyl ether with the chlorides of the acids from lauric to stearic inclusive. This reaction may be carried out in the presence of excess amine, such as two moles of amine to one mole of the acid chloride, or in the presence of an inorganic alkaline material, such as sodium or potassium hydroxide or carbonate as an acceptor for the hydrogen chloride liberated by the reaction. The reaction is preferably carried out in a solvent, especially such solvents as toluene or xylene or mixtures thereof with water. The temperature of reaction is generally from —10° to +20° C. for a period of one to four hours.

Examples of the amines which may thus be reacted include:

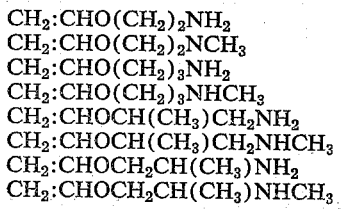

The amidoalkyl vinyl ethers are readily polymerized to produce homopolymers as well as copolymers having a wide range of molecular weights including molecular weights of 5000 to 50,000 or more. They may be polymerized in the presence of catalysts or initiators of the acyclic azo type. In such compound the —N:N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis($\alpha,\gamma$-dimethylvaleronitrile), azobis-($\alpha$-methylbutyronitrile), azobis($\alpha$-methylvaleronitrile), dimethyl azobismethylvalerate, and the like. In these catalysts one of the carbons bonded to the tertiary carbon atom has its remaining valences satisfied by at least one element from the class consisting of oxygen and nitrogen. Polymerization may be effected in bulk, in solution, or in emulsion systems. To effect polymerization the amidoalkyl vinyl ether and the acyclic azo catalyst are mixed directly or in the presence of an inert solvent and the mixture is maintained between 60° and 100° C. until the desired extent of polymerization is attained. Solvents that may be used in polymerization include methanol, ethanol, isopropanol, butanol, dimethylformamide, dimethylacetamide, toluene, benzene, xylene, and so on. The amount of catalyst may be varied from about 0.1 to about 5% of the weight of the monomers. The polymerization is best carried out in an inert atmosphere, such as nitrogen gas.

For polymerization in solution, concentrations of monomer from about 50 to 90% are suitable. The course of polymerization may be readily followed from the increase in viscosity of the solution. The catalyst may be added in increments if desired, with or without additional solvent.

For bulk polymerization, the preferred temperatures are from about 70° to 80° C. and the optimum proportion of catalyst is from 0.3% to 3% of the monomer weight.

The copolymerization may also be effected in an aqueous emulsion system using suitable emulsifying or dispersing agents, such as the higher alkylaryl polyethoxyethanols, such as the ethylene oxide modified alkyl phenols in which the alkyl group or groups has or have from 8 to 18 or more carbon atoms such as octyl, dodecyl, and octadecyl and which contain from 6 to 20 or more ethylene oxide units per molecule.

The vinyl ethers of the present invention may be copolymerized with a wide variety of compounds. Examples of monoethylenically unsaturated compounds which can thus be copolymerized with these vinyl ethers include vinylidene halides such as vinyl fluoride, vinyl chloride, vinyl bromide, vinyl iodide, 1,1-difluoroethylene, 1,1-dichloroethylene; vinylidene hydrocarbons such as isobutylene, 1,3-butadiene, styrene; halovinylidene hydrocarbons such as 2-fluoro-1,3-butadiene, 2-chloro-1,3-butadiene, 2,3-dichloro-1,3-butadiene; acrylic, haloacrylic and alkacrylic esters, nitriles and amides such as ethyl acrylate, methyl methacrylate, butyl methacrylate, methoxymethyl methacrylate, chloroethyl methacrylate, beta-diethylaminoethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; unsaturated aldehydes and ketones such as acrolein, methacrolein, methyl vinyl ketone; N-vinyl imides such as N-vinylphthalimide, N-vinyl-succinimide; unsaturated ethers such as vinyl ethyl ether; other vinyl monomers such as vinylpyridine, N-vinyl caprolactam; and other polymerizable or copolymerizable unsaturated monomers such as tetrafluoroethylene, diethyl fumarate, dimethyl maleate and the like.

Surface-active compounds are obtained by copolymerization of one to twenty-five mole percent of one or more monomeric vinyl ethers of the present invention with 75 to 99 mole percent of one or more water-soluble monomers such as acrylamide, ureidoethyl vinyl ether, vinyl pyrrolidone, formamidoethyl vinyl ether, hydroxyethyl acrylate and hydroxyethyl methacrylate. Alternatively, surface-active compounds may be produced by copolymerizing from 1 to 25 mole percent of the vinyl ethers of the present invention with 75% to 99% of vinyl acetate, vinyl propionate and the like, and thereafter hydrolyzing, preferably under alkaline conditions such as in the presence of sodium hydroxide or potassium carbonate, at elevated temperatures from 50° to 100° C. The higher fatty acid amides of the present invention are resistant to hydrolysis under these conditions so that the other monomeric units, such as those of vinyl acetate, are the only ones that are hydrolyzed.

The surface-active compounds thus obtained are valuable wetting agents, foaming agents, emulsifying and dispersing agents. They are highly useful in the paper, leather and textile industries wherever wetting agents or dispersing agents may be desired, such as in the mercerization of cotton or rayon, as emulsifiers in cosmetics such as hand lotions, as emulsifiers for use in polymerization procedures, also in agricultural uses for emulsifying pesticides, including fungicides and insecticides. In the sizing, conditioning and dressing of textiles, the emulsifiers are useful to prepare dispersions of other coating materials and have the advantage that they themselves, when deposited on the textiles or the like, have film-forming properties, and, because of that, do not detract from such properties of the other materials applied.

The monomers of the present invention are all crystalline solids which are insoluble in water and have little or no solubility in polar solvents, such as alcohols. They are waxy in character and have high melting points from about 74° C. to 90° C. The monomers are useful as fungicides and bactericides and, in addition, may be used to impart water-repellent finishes to leather, fabrics, paper, cellophane, or other materials.

The polymers are useful as substitutes for high-melting waxes since their melting points are generally from 90° to 125° C. They may be employed as water-repellent agents for the coating of textile fabrics, leather, paper, cellophane or other materials. They may be included in all sorts of polishes and waxes for polishing furniture, automobiles and so forth. They may be employed as a component of high-pressure greases. They may be employed as gelling agents for hydrocarbons, such as gasoline, for the purpose of producing flame-throwers. In the polymers derived from monomers in which the symbol R represents hydrogen, the highest melting points are obtained, namely from 95° to 125° C. When R is methyl, however, the melting point is somewhat lower. Generally, the polymers obtained from those monomers in which R is methyl are the most useful as lubricating mineral oil additives. From 2% to 6% of such a polymer on the weight of oil serves to improve the viscosity index. Preferably a mixture of polymers, each containing a different fatty acid radical in their acyl groups, is used for this purpose. Generally, the use of the monomers of the present invention in which R is methyl in the production of copolymers with lower methacrylates, acrylonitrile, memethacrylonitrile, vinyl chloride, vinylidene chloride, or the like, serves to internally plasticize the polymer obtained. For this purpose, 5 to 25 mole percent of the monomer or monomers of the present invention is generally quite adequate.

Surprisingly, the compounds of the present invention, both monomers and polymers, are stable to hydrolysis under alkaline conditions, are high melting crystalline solids which are soluble in non-polar solvents but insoluble generally in polar solvents, such as alcohols. Because of the resistance of the compounds to hydrolysis at the linkage of the acyl group to the amido nitrogen, the monomers of the present invention can be polymerized with other monomers in an emulsion system under acid or alkaline conditions without hydrolysis. This characteristic resistance to hydrolysis permits the use of the surface-active copolymers mentioned above in alkaline and acid media without decomposition of such character as to destroy the surface-activity of the compounds. Such surface-activity depends upon the highly hydrophobic group contributed to the copolymer by the higher fatty acid amido alkyl vinyl ethers of the present invention.

The following examples, in which the parts are by weight unless otherwise noted, are illustrative of the present invention:

Example 1

(a) A solution of 34.2 g. (0.113 mole) of stearoyl chloride in 50 ml. of toluene is added slowly to a stirred cooled solution of 22 g. (0.25 mole) of 2-aminoethyl vinyl ether in 50 ml. of toluene. The mixture is allowed to stir for one hour at room temperature and then treated with excess dilute aqueous caustic, cooled and filtered. The white solid is recrystallized from aqueous ethanol to give 33.5 g. of material, M. P. 84°–86° C., 85% yield. A second recrystallization from toluene with a prior filtration of the hot toluene solution yields 31 g. of N - (β-vinyloxyethyl) - stearamide, M. P. 86.5°–88° C. The material is soluble in acetone, dimethylformamide, methylated naphthalenes, ethanol and benzene when these solvents are hot, but it is insoluble in them when cold. *Analysis.*—Calculated for $C_{22}H_{43}NO_2$ in percent: C, 74.8; H, 12.18; N, 3.96; found: C, 74.64; H, 12.34; N, 3.95.

The N-(β-vinyloxyethyl)-stearamide at less than 1% concentration showed a 100% inhibition of germination of *Stemphylium sarcinaeforme*. At 1% it showed no phytotoxicity against tomatoes.

(b) The process of part (a) is carried out substituting 0.113 mole of palmitoyl chloride for the stearoyl chloride and 0.25 mole of 3-aminopropyl vinyl ether for the vinyl ether.

Example 2

(a) A mixture of 0.2 mole of methyl laurate with 0.2 mole of 2-aminoethyl vinyl ether in 100 ml. of methanol containing 2½ grams of sodium methoxide is heated to reflux for 4 to 8 hours with agitation. The white solid is recrystallized from ethylene dichloride. An 84% yield of N-(β-vinyloxyethyl)-lauramide is obtained having a melting point of 74° to 75° C. This compound has an inhibition zone of 9 mm. against *Micrococcus pyogenes*.

(b) In the same way, N-methyl-3-aminopropyl vinyl ether is reacted with methyl palmitate. A white crystalline solid is obtained having a waxy feel. It may be applied to yarns and threads to lubricate such materials to adapt them to sewing and weaving operations.

Example 3

(a) A mixture of 83 parts of the N-(β-vinyloxyethyl)-lauramide of Example 2(a) and 17 parts of dimethylformamide is heated to 75° C. with two parts by weight of dimethylazoisobutyrate. After 16 hours, a 40% yield of polymer is obtained. It is a solid and melts at 100° to 125° C. It is soluble in toluene but insoluble in methyl alcohol. It is highly effective as a lubricating finish for yarns to prepare them for weaving and knitting as well as sewing operations.

(b) The monomeric compound, N-methyl-N-(3-vinyloxypropyl)-palmitamide, produced in Example 2(b) from the N-methyl-3-aminopropyl vinyl ether and methyl palmitate is polymerized by the procedure of part (a) hereof with three moles of methyl methacrylate per mole of the amide. The resulting copolymer is quite flexible as compared to a homopolymer of methyl methacrylate.

Example 4

To a mixture of one part by weight of N-(β-vinyloxyethyl)-lauramide with nine parts by weight of ureidoethyl vinyl ether in ten parts by weight of dimethylformamide, 0.15 part by weight of dimethylazoisobutyrate is introduced as a catalyst and the mixture is heated at 75° C. for 16 hours. On precipitation by the addition of acetone, 9 parts by weight of a copolymer is obtained which is readily dispersed in water and shows surface-activity and foaming action. The addition of 1% of this copolymer to a 15% sodium hydroxide solution in water increases the rapidity of mercerizing action on cotton and the mercerized product is more uniform.

*Example 5*

One part by weight of N-(β-vinyloxyethyl)-lauramide and 19 parts by weight of ureidoethyl vinyl ether are dissolved in 20 parts by weight of dimethylformamide and 0.3 part by weight of diisoazobutyrate is added. After heating the mixture at 75° C. for 16 hours, 18 parts by weight of a copolymer is obtained by precipitation with acetone. The product is surface-active and is useful in conjunction with soap to form a built soap detergent.

*Example 6*

N-(β-vinyloxyethyl)-stearamide (10 parts by weight) is dissolved in 10 parts by weight of dimethylformamide and 0.15 part by weight of dimethylazoisobutyrate is added. On polymerization at 75° C. for 16 hours and precipitation with acetone, 7.5 parts by weight of a polymer is obtained which is insoluble in acetone and hot ethanol but is quite soluble in toluene. On drying a raincoat fabric impregnated with a 10% solution of the polymer in toluene, an excellent water-repellency and hand is obtained in the fabric.

*Example 7*

N-methyl-N-(β-vinyloxyethyl)-lauramide (one part) and two parts of N-(β-vinyloxyethyl)-stearamide are dissolved in four parts by weight of dimethylformamide and 0.05 part of dimethylazoisobutyrate is added. After polymerization for 18 hours at 75° C., an oil-soluble waxy copolymer is obtained. The incorporation of 2% to 6% by weight of the copolymer in a lubricating oil improved the viscosity index and depressed the pour point.

It is to be understood that changes and variations may be made without departing from the spirit and scope of the invention as defined in the appended claims.

I claim:

1. A composition comprising a compound having the formula $$CH_2\!:\!CHOANRCOR'$$

where A is an alkylene group having 2 to 3 carbon atoms of which at least 2 in a chain separate the adjoining ether oxygen and nitrogen atoms, R is selected from the group consisting of H and $CH_3$, and R' is an alkyl group having from 11 to 17 carbon atoms.

2. A composition comprising a polymer of a compound of claim 1.

3. A composition comprising a copolymer of a compound of claim 1 with at least one other monoethylenically unsaturated copolymerizable compound.

4. As a new composition of matter, N-(β-vinyloxyethyl)-lauramide.

5. As a new composition of matter, N-(3-vinyloxypropyl)-palmitamide.

6. As a new composition of matter, N-(β-vinyloxyethyl)-stearamide.

7. As a new composition of matter, N-methyl-N-(3-vinyloxypropyl)-palmitamide.

8. As a composition of matter, a copolymer of 1 to 25 mole percent of a compound of claim 1 with 75 to 99 mole percent of monomeric units of at least one other water-soluble monoethylenically unsaturated comonomer.

9. As a composition of matter, a polymer of N-(β-vinyloxyethyl)-lauramide.

10. As a composition of matter, a polymer of N-(3-vinyloxypropyl)-palmitamide.

11. As a composition of matter, a polymer of N-(β-vinyloxyethyl)-stearamide.

12. As a composition of matter, a copolymer of 1 to 25 mole percent of a compound of claim 1 with 75 to 99 mole percent of ureidoethyl vinyl ether.

13. As a composition of matter, a copolymer of 1 to 25 mole percent of N-(β-vinyloxyethyl)-lauramide with 75 to 99 mole percent of ureidoethyl vinyl ether.

14. As a composition of matter, a copolymer of 1 to 25 mole percent of N-(β-vinyloxyethyl)-stearamide with 75 to 99 mole percent of ureidoethyl vinyl ether.

15. As a composition of matter, a copolymer of N-methyl-N-(3-vinyloxypropyl)-palmitamide and methyl methacrylate.

16. As a composition of matter, a copolymer of N-methyl-N-(β-vinyloxyethyl)-lauramide and N-(β-vinyloxyethyl)-stearamide.

References Cited in the file of this patent

UNITED STATES PATENTS 2,686,173    Sauer _____ Aug. 10, 1954